Jan. 12, 1965     H. L. WARNER     3,165,103
WATER HEATER Filed Jan. 29, 1963                               3 Sheets-Sheet 1

INVENTOR.
HARRY L. WARNER
BY HIS ATTORNEYS
HARRIS, KIECH, RUSSELL & KERN

Jan. 12, 1965 H. L. WARNER 3,165,103
WATER HEATER
Filed Jan. 29, 1963 3 Sheets-Sheet 3

INVENTOR.
HARRY L. WARNER
BY HIS ATTORNEYS
HARRIS, KIECH, RUSSELL & KERN

United States Patent Office 3,165,103
Patented Jan. 12, 1965

3,165,103
WATER HEATER
Harry L. Warner, 2508 E. Evergreen Ave.,
West Covina, Calif.
Filed Jan. 29, 1963, Ser. No. 254,718
16 Claims. (Cl. 126—350)

The present invention relates in general to an apparatus for heating liquids, especially water, and, more particularly, to an apparatus for heating the water in a swimming pool to maintain it at a comfortable temperature. The invention contemplates a combustion heater preferably utilizing a gaseous fuel, such as natural gas.

A primary object of the invention is to provide a heater of the foregoing nature which is capable of transferring to the water to be heated close to 100%, relative to atmospheric temperature, of the heat contained in the products of combustion resulting from burning of the gaseous fuel. More particularly, an object is to provide a heater having a heat transfer efficiency of the order of 90% to 95%. With a heat transfer efficiency of this order, very little heat escapes with the gaseous products of combustion discharged into the atmosphere, the temperature of the heater exhaust approaching atmospheric temperature.

Another object of the invention is to divided the heat transfer from the gaseous products of combustion to the water into two phases, the first involving transferring heat from the products of combustion to primary water in a water jacket at least partially enclosing an upstream combustion chamber or zone, and the second involving heat transfer to secondary water by direct and intimate contact with the exhaust gases in a water chamber downstream from the combustion chamber. A related object is to provide generally countercurrent flow of the primary water in the water jacket relative to the gaseous flow, i.e., to provide flow of primary water through the water jacket in a direction which is generally upstream relative to the direction of the gaseous stream which includes the products of combustion.

An important object of the invention is to provide a heater of the foregoing character which is horizontally oriented, having a horizontally facing air inlet at its inlet end and a horizontally facing exhaust outlet at its outlet end, and which includes forced draft means for producing circulation therethrough from its inlet to its outlet. A related object is to provide a heater having these characteristics which is generally rectangular, i.e., which is rectangular in cross section in a horizontal plane therethrough and in perpendicular vertical planes therethrough, and which is horizontally elongated from its inlet end to its outlet end.

The foregoing horizontal orientation and rectangular construction is important for various reasons. First, it provides a heater which may be located above ground adjacent a swimming pool without detracting from the appearance of the pool and its environs, by avoiding any vertical tower, any upright exhaust stack, or the like. Further, being horizontally oriented, the rectangular heater of the invention may be blended into the decor of the swimming pool and its surroundings so as to render it an attractive adjunct thereto. For example, by providing the heater of the invention with a suitable seating surface, it may be utilized as a bench merging with the environs of the swimming pool. Various other aesthetically pleasing treatments may be utilized which are not possible with above-ground vertical heaters, above-ground heaters having upright exhaust stacks, or the like.

With the foregoing background, an important object of the invention is to provide a swimming pool heater which includes: a horizontally oriented rectangular housing having inlet and outlet ends and provided at its inlet end with a horizontally facing air inlet and at its outlet end with a horizontally facing outlet for products of combustion; forced draft means in the housing for flowing air and products of combustion through the housing from its inlet to its outlet; a combustion chamber in the housing adjacent its inlet end; burner means in the combustion chamber adjacent the inlet end of the housing and facing the outlet end thereof; a water jacket at least partially enclosing the combustion chamber; a water chamber in the housing adjacent its outlet end; means in the housing for distributing water throughout the water chamber into direct and intimate contact with the products of combustion emanating from the combustion chamber and passing through the water chamber; a sump in the housing at the bottom of the water chamber for collecting the water distributed throughout the water chamber by the distributing means; the water jacket having discharge means communicating with the sump; the sump having water outlet means; and water supply means connected to the water jacket and to the water distributing means for delivering water to be heated thereto. A related object is to provide generally countercurrent flow of the primary water in the water jacket relative to the gaseous flow through the housing, by delivering water to the water jacket at its downstream end and by discharging heated water therefrom at its upstream end. Preferably, the primary water is introduced into and discharged from the water jacket adjacent the top thereof, vertical circulation of the primary water throughout the water jacket occurring by convection.

I have found that heat transfer efficiencies approaching 100%, i.e., heat transfer efficiencies of 90% to 95%, or more, may be attained by so dividing the flow of water introduced into the heater by the water supply means that the flow of secondary water to the water distributing means constitutes a major portion of the total. More specifically, the flow of primary water to the water jacket constitutes a portion of the total ranging up to the order of one-third. An extremely important object of the invention is to divided the total water delivered to the heater between the water jacket and the water distributing means in the foregoing proportions to achieve maximum efficiency of heat transfer to the total water flow.

With the foregoing construction, the temperature of the products of combustion in the combustion chamber may be of the order of 1000° F., or more, yet the temperature of the exhaust gases discharged from the outlet of the housing is relatively low, e.g., less than 100° F., indicating that nearly all of the heat has been extracted and transferred to the water, which is an important feature of the invention.

Another object of the invention is to provide a heater wherein the water jacket which at least partially encloses the combustion chamber has the form of a metal insert in the housing, which is preferably of concrete. A more specific object in this connection is to provide a water jacket having the general configuration of an inverted U, the water jacket including a transverse section extending across the housing above the combustion zone, and upright sections, depending from such upper, transverse section, and lining the sides of the combustion chamber.

Still another object of the invention is to provide distributing means for distributing the water throughout the water chamber into direct and intimate contact with the products of combustion, which may take various forms, including spray-type distributing means for spraying water upwardly throughout the water chamber, drip-type distributing means for dripping water downwardly throughout the water chamber, ripple-type distributing means for forming downwardly descending water ripples throughout the water chamber, and the like.

A further object of the invention is to provide vertical baffles in the water chamber, alternate ones of which extend downwardly from the top of the water chamber toward the bottom thereof, and the rest of which extend upwardly from the bottom of the water chamber toward the top thereof, and to provide in conjunction with such vertical baffles distributing means for distributing water vertically throughout the water chamber between the various baffles, either by upward spraying, or downward dripping. With this construction, the products of combustion emanating from the combustion chamber are required to follow a serpentine path through the upwardly sprayed, or downwardly dripping, water, as they pass over the upwardly extending baffles and under the downwardly extending baffles. The result is intimate contacting of the secondary water delivered to the water chamber with the exhaust gases from the combustion chamber, thereby effecting maximum heat transfer from the exhaust gases to the secondary water, which is an important feature.

Yet another object of the invention is to provide a heater wherein the sump mentioned extends longitudinally throughout substantially the entire housing, underlying the combustion chamber as well as the water chamber, so that the heated primary water discharged from the water jacket through the upstream discharge means thereof falls directly into the sump for admixture with the secondary water heated in the water chamber by direct contact with the exhaust gases.

The foregoing objects, advantages, features and results of the present invention, together with various other objects, advantages, features and results thereof which will be evident to those skilled in the swimming pool heating art in the light of this disclosure, may be achieved with the exemplary embodiments of the invention described in detail hereinafter and illustrated in the accompanying drawings, in which:

Figure 1:
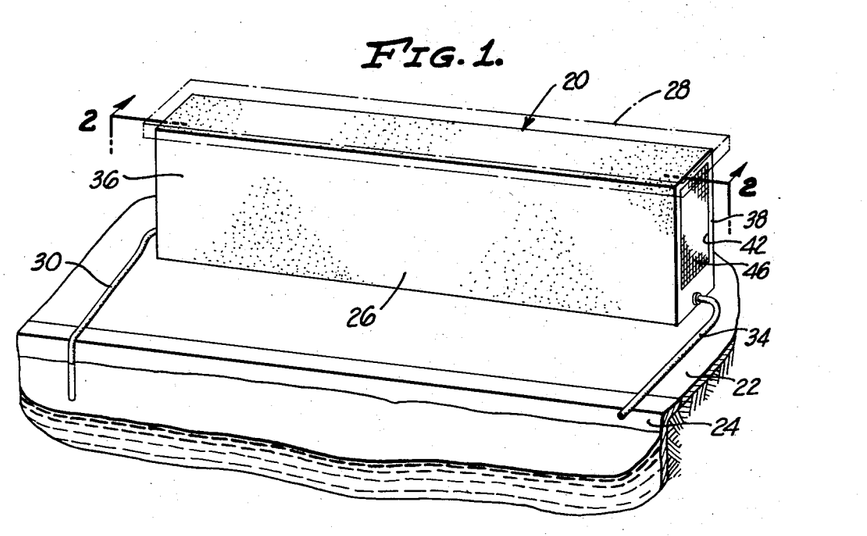
FIG. 1 is a perspective view illustrating one embodiment of a swimming pool heater of the invention in one possible installation adjacent a swimming pool.

Referring initially to FIG. 1 of the drawings, the swimming pool heater is designated generally therein by the numeral 20 and is shown as installed on a deck 22 adjacent a swimming pool 24. As clearly shown in the figure in question, the heater 20 has the form of a horizontally oriented, elongated rectangular box which blends well into the surroundings of the swimming pool 24, and which avoids any unsightly, vertically extending structure, such as a tower, upright stack, or the like. Additionally, the heater 20 is defined by an elongated rectangular housing 26 which is preferably cast from a lightweight concrete, thus having a texture which corresponds to that of the deck 22, and other concrete work, or stone work, which may be incorporated in the decor of the environs of the pool. The concrete of the housing 26 may be suitably colored in any appropriate manner to fit in with the decor of the pool area. Additionally, the heater 20 of the invention may be utilized as a bench by providing it with any desired bench top, shown in phantom at 28. This provides an additional utilitarian attribute for the heater 20, and further serves to complement the pool environs.

Figure 2:
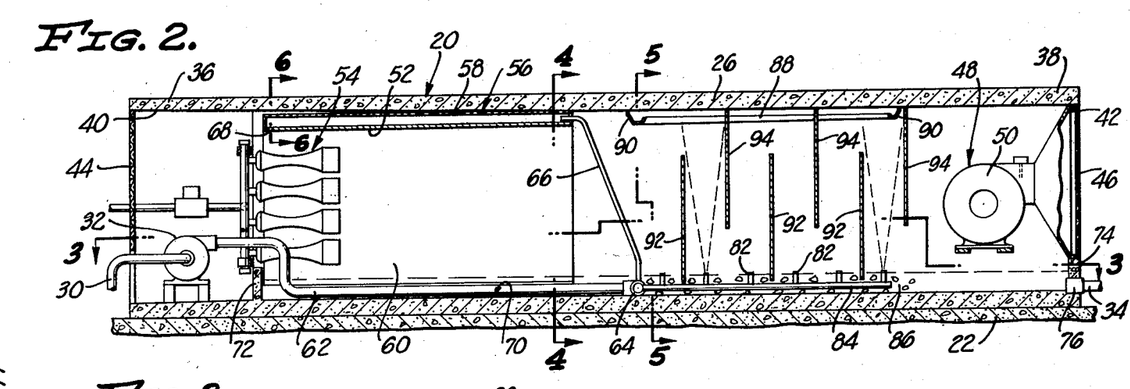
FIG. 2 is an enlarged, vertical longitudinal sectional view through the swimming pool heater of FIG. 1 and is taken as indicated by the arrowed line 2—2 of FIG. 1.
Figure 3:
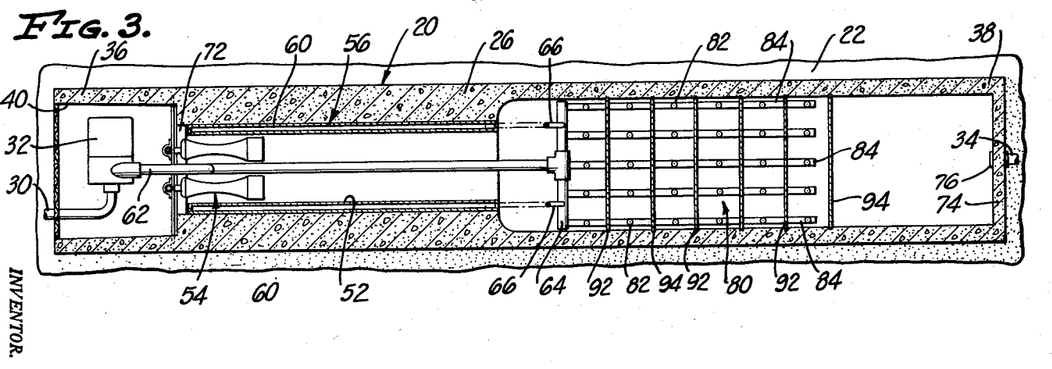
FIG. 3 is a horizontal longitudinal sectional view taken as indicated by the arrowed line 3—3 of FIG. 2.
Figure 4:
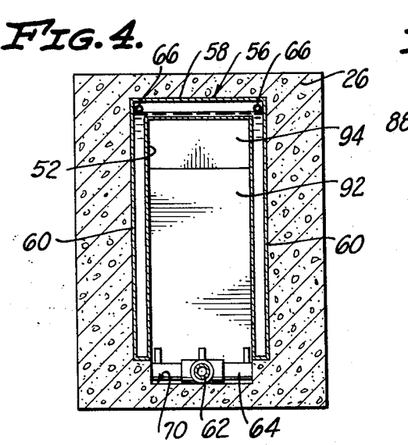
FIGS. 4, 5 and 6 are vertical transverse sectional views respectively taken along the arrowed lines 4—4, 5—5 and 6—6 of FIG. 2, FIG. 6 being a fragmentary view.
Figure 5:
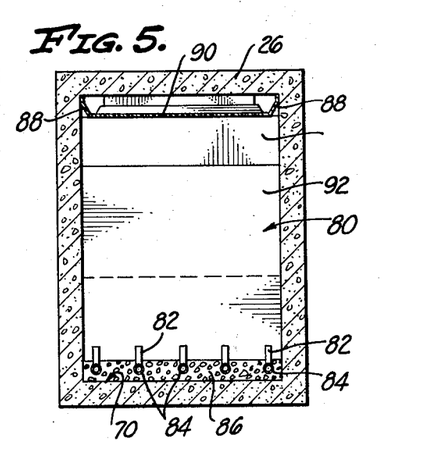
Figure 6:
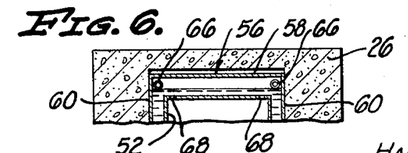

In the particular installation illustrated in FIG. 1 of the drawings, the heater 20 is provided with a suction line 30 connected to a pump 32, FIGS. 2 and 3, for delivering water from the pool 24 to the heater through a water inlet line 62 connected to the pump outlet. The heated water is returned to the pool through an outlet or return line 34. In the heater installation illustrated, which may be one for an existing pool, the suction and outlet lines 30 and 34 are merely laid on the deck 22, with at least the suction line 30 extending over one edge of the pool into the water therein, the outlet end of the outlet line being submerged also if desired.

It will be understood, however, that these connections between the heater 20 and the pool 24 are illustrative only, and that the necessary connections may be concealed below the deck 22, particularly in an installation made at the time of building the pool. In such an installation, the water inlet line leading to the heater 20 and the outlet line for returning heated water to the pool may be in any desired locations. For example, the inlet line 62 of the heater 20 may be connected to the discharge side of a filter, not shown, with which the pool is equipped. This has the advantage of insuring that only filtered water is passed through the heater 20. Under such circumstances, the pump 32 may be eliminated, and the pump, not shown, normally provided for circulating water through the filter may be used to deliver water to be heated to the heater 20 after filtering. Thus, it will be understood that the heater 20 of the invention may be connected to the pool 24 in various ways and that the invention is not to be regarded as limited to the specific way shown.

Referring to FIGS. 1 to 6 of the drawings, the housing 26 has the form of a horizontally oriented tube which is rectangular in cross section, both in horizontal and vertical longitudinal planes therethrough, and in transverse vertical planes therethrough. The housing 26 has horizontally spaced inlet and outlet ends 36 and 38 respectively providing an inlet 40 and an outlet 42 which face horizontally in opposite directions. The inlet 40 and the outlet 42 are shown as provided with inlet and outlet grilles or screens 44 and 46, respectively. The heater 20 includes forced draft means 48 for producing gaseous flow through the housing 26 from its outlet 42. The forced draft means 48 is shown as including a blower 50 mounted in the housing 26 adjacent its outlet end 38 and having its outlet connected to the outlet 42 of the housing 26. The blower 50 may be driven in any suitable manner, as by an electric motor, not shown. While the forced draft means 48 is shown as located adjacent the outlet end 38 of the housing 26, the invention is not limited thereto. For example, the forced draft means may be located adjacent the inlet end 36 of the housing 26, or forced draft may be attained by utilizing conventional pressure burners for the gas burner means hereinafter discussed.

The housing 26 is provided adjacent its inlet end 36 with a section of reduced width, FIG. 3, containing a combustion chamber 52 of substantial length extending approximately to the longitudinal midpoint of the housing. Within the combustion chamber 52 adjacent the upstream end thereof is a gas burner means 54 of any suitable construction which faces in the downstream direction, i.e., which faces toward the outlet end 38 of the housing. The gas burner means 54 is shown as including a plurality of downstream-facing burners and includes the usual gas controls, and the like, it being unnecessary to describe the gas burner means in detail herein.

The combustion chamber 52 is enclosed at its top and along its sides by a water jacket 56 which is preferably a separate component inserted into the housing 26. The water jacket 56 has the general form of an inverted U, including a transverse upper section 58 extending across the interior of the housing 26 adjacent the top thereof, and including depending side sections 60 extending downwardly along the sides of the housing substantially to the bottom thereof. With this construction, heat from burning gas in the combustion chamber 52, and from products of combustion therein, is transferred to primary water in the water jacket 56 through the lower wall of the upper section 58 thereof, and through the inner walls of the side sections 60 thereof.

The heater 20 includes the water inlet line 62, which extends longitudinally through the housing 26 along the bottom wall thereof to a transverse manifold 64 located at substantially the longitudinal midpoint of the housing. The inlet line 62 is provided with water from the pool 24, in the particular construction illustrated, through the suction line 30 and the pump 32. As hereinbefore explained, however, the inlet line 62 may be supplied with water from the pool 24 in other ways, as by a pump associated with a filter, not shown, for filtering the water in the pool.

Branching off from the manifold 64 are primary water supply lines 66 which are connected to the upper section 58 of the water jacket 56 at the downstream end of the water jacket. The branch lines 66 are so designed that they deliver primary water to the water jacket 56 in the proportion hereinbefore set forth. The primary water introduced into the water jacket 56 through the branch lines 66 from the manifold 64 circulates throughout the upper and side sections 58 and 60 of the water jacket by convection, the cool water initially introduced circulating downwardly in the side sections and eventually upwardly therein as it is heated. The general flow of primary water through the water jacket 56 is preferably in the upstream direction relative to the gaseous flow from the inlet 40 to the outlet 42 of the housing 26. In other words, the general primary water flow through the water jacket 56 is countercurrent relative to the gaseous flow. Ultimately, the heated primary water is discharged from the water jacket 56 through discharge openings 68, FIGS. 2 and 6, formed in the bottom wall of the upper section 58 at the end of the water jacket which is closest to the inlet end 36 of the housing 26. It will be understood that the size of the discharge openings 68 is so related to the rate of primary water introduction through the branch supply lines 66 as to maintain the water level in the water jacket 56 above the bottom wall of the upper section 58 thereof.

As an alternative to the foregoing, the water jacket 56 may be completely filled and the water therein may be maintained at superatmosphere pressure. This may be accomplished by utilizing the back pressure provided by the spray nozzles 82 hereinafter described to maintain superatmospheric pressure in the water jacket 56, and by making the discharge openings 68 sufficiently small to maintain the desired superatmospheric pressure, while still bleeding off through the discharge openings the desired 10% to 15% of the total water flow. Another possibility in this connection is that, when the water jacket 56 is pressurized, the water jacket and the spray nozzles 82 to be discussed may be connected in series, with the water jacket upstream from the spray nozzles, instead of connecting the water jacket and the spray nozzles in parallel as shown.

The heated primary water discharged from the water jacket 56 through the discharge openings 68 falls downwardly into a sump 70 which extends substantially the full length of the housing 26 from an integral upstream dam 72 adjacent the burner means 54 to an integral downstream dam 74 at the outlet end 38 of the housing. Extending the sump 70 longitudinally under the burner means 54 is important since it prevents overheating of the bottom wall of the housing 26. Thus, the combustion chamber 52 is completely jacketed by water to prevent excessive local heating of any part of the housing 26, thereby preventing damage thereto and/or injury to persons coming into contact therewith. It will be understood that the water jacket 56 encloses the top and sides of the combustion chamber 52, while the water in the sump 70 jackets the bottom of the combustion chamber.

The sump 70 is shown as provided with a water outlet 76 extending through the downstream dam 74 in the particular construction illustrated, and communicating with the outlet or return line 34 leading back to the pool 24. It will be understood, however, that in a heater installation made at the time of building the pool 24, the outlet 76 may be formed in the bottom wall of the housing 26 so as to drain heated water from the sump 70 into a return line below the deck 22. Also, instead of returning the heated water to the pool 24 by gravity, a suitable pump, such as a jet pump, not shown, associated with the sump outlet, may be utilized.

Downstream from and having approximately the same longitudinal extent as the combustion chamber 52 and the water jacket 56 is a water chamber 80 wherein secondary water is intimately brought into direct contact with the exhaust gases from the combustion chamber, the primary water delivered to the water jacket and the secondary water distributed throughout the water chamber 80 making up the total water supplied to the heater 20. The secondary water is distributed uniformly throughout the water chamber 80, into direct and intimate contact with the products of combustion, by upwardly directed spray nozzles 82 mounted on branch pipes 84 located adjacent the bottom of the housing 26 and extending longitudinally downstream from the manifold 64. In the particular construction illustrated, there are five of the branch pipes 84 and each is provided with six of the spray nozzles 82 for a total of thirty spray nozzles. However, this number can be varied.

The secondary water is sprayed upwardly throughout the entire water chamber 80 by the spray nozzles 82 to insure intimate and direct contact with the products of combustion flowing from the combustion chamber 52. The upwardly-sprayed secondary water thus extracts heat from the products of combustion, and the heated secondary water falls back into the sump 70 for admixture with the heated primary water discharged into the sump from the water jacket 56. If desired, the sump 70 may contain a limestone bed 86 to absorb excess carbonic acid which may result from dissolving of carbon dioxide in the secondary water.

The water sprayed upwardly along the sides of the housing 26 may encounter relatively stagnant products of combustion and thus may not be heated as much as the water sprayed upwardly in the transverse center of the housing. For better heating of the secondary water sprayed upwardly along the sides of the water chamber 80, the latter is provided at the top thereof and along the sides thereof with longitudinal troughs 88 which catch some of such water. These troughs deliver the water trapped thereby into transverse troughs 90 which extend across the water chamber 80 adjacent the top thereof and which have perforated bottoms to cause the trapped water to drip downwardly in fine streams across the stream of exhaust gases flowing through the housing 26. The trapping troughs 88 and the drip troughs 90 communicating therewith improve heat transfer to the secondary water somewhat, although they are not absolutely essential in the embodiment under consideration.

To further improve heat transfer to the secondary water distributed throughout the water chamber 80, the exhaust gases from the combustion chamber 52 are caused to traverse the water chamber longitudinally in a serpentine fashion. This is accomplished by alternating upwardly extending and downwardly extending baffles 92 and 94, respectively. The upwardly extending baffles 92 extend upwardly from adjacent the bottom of the water chamber 80, their lower edges preferably being below the water level in the sump 70, to points below the top of the water chamber. Conversely, the baffles 94 extend downwardly from the top of the water chamber 80 to points above the water level in the sump 70. Thus, in traversing the water chamber longitudinally, the products of combustion from the combustion chamber 52 must flow upwardly over the baffles 92 and downwardly under the baffles 94, the products of combustion thus following the desired serpentine path to insure more intimate contact with the secondary water distributed throughout the water chamber to promote heat transfer efficiency.

An important feature of the invention is that the baffles 92 and 94 are so dimension and spaced that the area of the passages between adjacent baffles, the area of the passages over the baffles 92, and the area of the passages under the baffles 94, are all substantially equal. Thus, the exhaust gases flowing through the system of baffles 92 and 94 follow a serpentine path having a substantially uniform cross-sectional area. Another important feature is that this cross-sectional area is less than the area of the air inlet 40.

With the foregoing construction, the flow resistance through the system of baffles 92 and 94 results in a higher pressure in the exhaust gases at the upstream end of the system of baffles. As a result, the first baffle in the series is heated to a relatively high temperature over most of its area, successive baffles in the series being heated to progressively lower extents. Water sprayed upwardly throughout the water chamber 80 by the spray nozzles 82 comes into contact with the heated baffles 92 and 94 to produce heating of such water by direct contact, such direct-contact heating of the water decreasing from baffle to baffle in the downstream direction. This effect further promotes high heat-transfer efficiency, which is an important feature.

As hereinbefore pointed out, I have discovered that, with the construction described, surprisingly high heat transfer efficiencies, in the range of 90% to 95%, or higher, can be achieved by proportioning the flow of primary water to the water jacket 56 and the flow of secondary water to the water chamber 80 in the manner hereinbefore set forth. The result is only a very slight heat loss through the outlet 42, as indicated by a discharge temperature not much above atmospheric, which is an important feature.

It will be understood that the heater 20 of the invention may also be utilized as an evaporative cooler, when necessary, to cool the swimming pool water. In this instance, the water from the swimming pool is circulated through the heater 20 with the burner means 54 inoperative, the water being evaporatively cooled in the water spray chamber 80 as air is circulated through the heater 20 by the forced draft means 48. Such evaporative cooling of swimming pool water is necessary in many desert or semi-desert regions of the United States during the summer when atmospheric temperatures reach extremely high levels, examples being desert or semi-desert regions of southern California, Nevada, Arizona, and the like. Preferably, the heater 20 of the invention is utilized as a swimming pool cooler at night when atmospheric temperatures are lower.

While the spray-type water distributing means hereinbefore described is the presently preferred means for distributing the secondary water throughout the water chamber 80 various other distributing means may also be used. Various distributing means are shown in FIGS. 7 to 13 of the drawings and will now be described.

Figure 7:
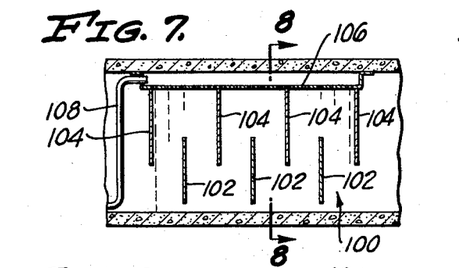
FIG. 7 is a fragmentary, vertical longitudinal sectional view of another embodiment.
Figure 8:
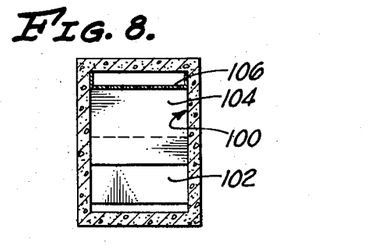
FIG. 8 is a vertical transverse sectional view taken along the arrowed line 8—8 of FIG. 7.

Considering FIGS. 7 and 8 of the drawings, illustrated therein is a water chamber 100 corresponding to the water chamber 80 and provided therein with alternately upwardly extending and downwardly extending baffles 102 and 104 respectively corresponding to the baffles 92 and 94. Located at the top of the water chamber 100, and laterally and longitudinally coextensive therewith, is a drip pan 106 which is supplied with the secondary water through a supply line 108. The bottom of the drip pan 106 is provided with numerous perforations which permit a very large number of fine water streams to drop downwardly through the water chamber 100 between the baffles 102 and 104. Such fine drip streams, coupled with the serpentine passage of products of combustion over the baffles 102 and under the baffles 104, produces very intimate contact between the secondary water and the products of combustion to produce a high heat transfer efficiency.

Figure 9:
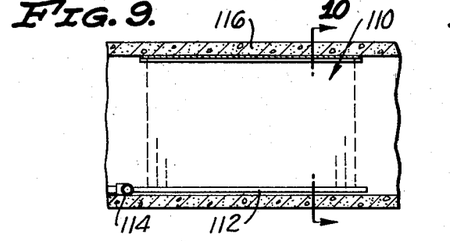
FIG. 9 is a fragmentary, vertical longitudinal sectional view of still another embodiment.
Figure 10:
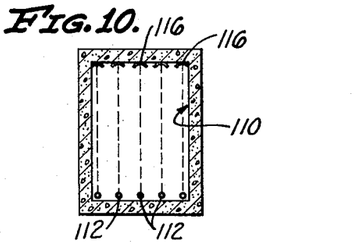
FIG. 10 is a transverse sectional view taken along the arrowed line 10—10 of FIG. 9.

In FIGS. 9 and 10 of the drawings is shown a water chamber 110 having at the bottom thereof a plurality of spray pipes 112 extending longitudinally downstream from a secondary-water supply manifold 114. The spray pipes 112 have perforations producing a multitude of fine upward jets of water which impinge on concave deflectors 116 at the top of the water chamber. These deflectors break the water jets up into finely divided sprays which descend downwardly through the water chamber 110 to the sump at the bottom thereof. Again, the result is intimate contact between the secondary water and the products of combustion to promote heat transfer. It will be understood that, in this embodiment, the water level in the sump must be maintained below the upper surfaces of the spray pipes 112.

Figure 11:
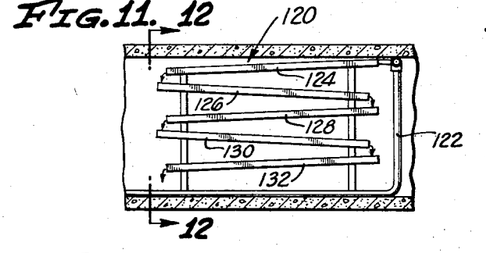
FIG. 11 is a fragmentary, vertical longitudinal sectional view of yet another embodiment.
Figure 12:
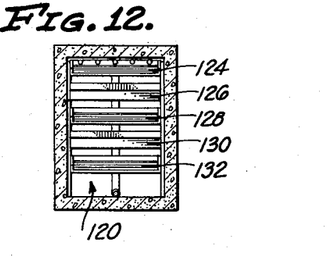
FIG. 12 is a transverse vertical sectional view taken along the arrowed line 12—12 of FIG. 11.

Turning now to FIGS. 11 and 12 of the drawings, illustrated therein is a water chamber 120 which includes a secondary-water supply line 122 for delivering water to an upper ripple tray or pan 124 which slopes in the longitudinal direction. The water from the ripple tray 124 falls onto another ripple tray 126 sloping longitudinally in the opposite direction, this being repeated through ripple trays 128, 130 and 132. The water from the last ripple tray 132 discharges into the sump at the bottom of the water chamber 120. As the water cascades downwardly along the respective ripple trays, and from each ripple tray in the series to the next, it is brought into intimate contact with the products of combustion to produce excellent heat transfer. It will be understood that the ripple trays are rippled or corrugated transversely of the water chamber 120.

Figure 13:
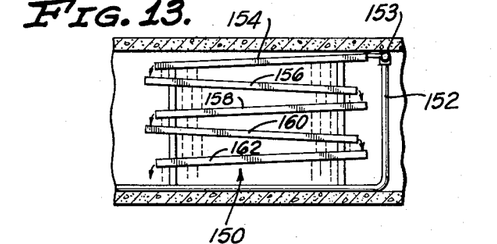
FIG. 13 is a fragmentary, vertical longitudinal sectional view of an additional embodiment of the invention.

Considering FIG. 13 of the drawings, illustrated therein is a water chamber 150 provided with a secondary-water supply line 152 terminating in a manifold 153 for delivering water to a series of sloping trays 154, 156, 158, 160 and 162 corresponding to the trays 124, 126, 128, 130 and 132. In this instance, the trays have perforated bottoms and thus act as drip trays for dripping water vertically through the water chamber 150, any excess water on each tray spilling over the lower end thereof either onto the next tray, or into the sump in the case of the last tray 162. The combined dripping and cascading effect produced by this embodiment also results in excellent heat transfer to the secondary water distributed throughout the water chamber 150.

Although exemplary embodiments of the invention have been disclosed herein for purposes of illustration, it will be understood that various changes, modifications and substitutions may be incorporated in such embodiments without departing from the spirit of the invention as defined by the claims which follow:

1. In a swimming pool heater, the combination of:
   (a) a horizontally oriented housing having inlet and outlet ends and provided at its inlet end with a horizontally facing air inlet and at its outlet end with a horizontally facing outlet for products of combustion;
   (b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) means in said housing for distributing water throughout said water chamber into drieot and intimate contact with the products of combustion emanating from said combustion chamber and passing through said water chamber;

(h) a sump in said housing at the bottom of said water chamber for collecting the water distributed throughout said water chamber by said distributing means;

(i) said water jacket having discharge means communicating with said sump;

(j) said sump having water outlet means; and (k) water supply means connected to said water jacket and to said water distributing means for delivering water to be heated thereto.

2. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion throught said housing from its inlet to its outlet;

(c) a combustion chamber in said housing adjacent its inlet end;

(d) burner means in said combustion chamber adjacent the inlet end of said housing and facing the outlet end thereoff;

(e) a water packet at least partially enclosing said combustion chamber;

(f) a water chamber in said housing adjacent its outlet end;

(g) means in said housing for distributing water throughout said water chamber into direct and intimate contact with the products of combustion emanating from said combustion chamber and passing through said water chamber;

(h) a sump in said housing at the bottom of said water chamber for collecting the water distributed through said water chamber by said distributing means;

(i) said water jacket having discharge means communicating with said sump;

(j) said sump having water outlet means; and (k) water supply means connected to said water jacket and to said water distributing means for delivering water to be heated thereto, including means for delivering a major portion of the water to said water distributing means.

3. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) means in said housing for distributing water throughout said water chamber into direct and intimate contact with the products of combustion emanating from said combustion chamber and passing through said water chamber;

(h) a sump in said housing at the bottom of said water chamber for collecting the water distributed throughout said water chamber by said distributing means;

(i) said water jacket having discharge means communicating with said sump;

(j) said sump having water outlet means; and (k) water supply means connected to said water jacket and to said water distributing means for delivering water to be heated thereto, including means for delivery up to the order of one-third of the water to said water jacket and the balance to said water distributing means.

4. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) spray-type distributing means in said housing for spraying water upwardly throughout said water chamber into direct and intimate contact with the products of combustion emanating from said combustion chamber and passing through said water chamber;

(h) a sump in said housing at the bottom of said water chamber for collecting the water distributed throughout said water chamber by said distributing means;

(i) said water jacket having discharge means communicating with said sump;

(j) said sump having water outlet means; and (k) water supply means connected to said water jacket and to said water distributing means for delivering water to be heated thereto.

5. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) drip-type distributing means in said housing for dripping water downwardly throughout said water chamber into direct and intimate contact with the products of combustion emanating from said combustion chamber and passing through said water chamber;

(h) a sump in said housing at the bottom of said water chamber for collecting the water distributed throughout said water chamber by said distributing means;

(i) said water jacket having discharge means communicating with said sump;

(j) said sump having water outlet means; and (k) water supply means connected to said water jacket and to said water distributing means for delivering water to be heated thereto.

6. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) ripple-type distributing means in said housing for rippling water downwardly throughout said water chamber into direct and intimate contact with the products of combustion emanating from said combustion chamber and passing through said water chamber;

(h) a sump in said housing at the bottom of said water chamber for collecting the water distributed throughout said water chamber by said distributing means;

(i) said water jacket having discharge means communicating with said sump;

(j) said sump having water outlet means; and (k) water supply means connected to said water jacket and to said water distributing means for delivering water to be heated thereto.

7. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) vertical baffles in said water chamber alternate ones of which extend downwardly from the top of said water chamber toward the bottom thereof, and the rest of which extend upwardly from the bottom of said water chamber toward the top thereof;

(h) means in said housing for distributing water vertically throughout said water chamber and between said baffles into direct and intimate contact with the products of combustion emanating from said combustion chamber and passing through said water chamber;

(i) a sump in said housing at the bottom of said water chamber for collecting the water distributed throughout said water chamber by said distributing means;

(j) said water jacket having discharge means communicating with said sump;

(k) said sump having water outlet means; and (l) water supply means connected to said water jacket and to said water distributing means for delivering water to be heated thereto.

8. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket at least partially enclosing said combustion chamber;

(f) a water chamber in said housing adjacent its outlet end;

(g) vertical baffles in said water chamber alternate ones of which extend downwardly from the top of said water chamber toward the bottom thereof, and the rest of which extend upwardly from the bottom of said water chamber toward the top thereof;

(h) the area of the passages between adjacent baffles, the area of the passages below said downwardly extending baffles, and the area of the passages above said upwardly extending baffles, all being substantially equal and being less than the area of said air inlet;

(i) means in said housing for distributing water vertically throughout said water chamber and between said baffles into direct and intimate contact with the products of combustion emanating from said combustion chamber and passing through said water chamber;

(j) a sump in said housing at the bottom of said water chamber for collecting the water distributed throughout said water chamber by said distributing means;

(k) said water jacket having discharge means communicating with said sump;

(l) said sump having water outlet means; and (m) water supply means connected to said water jacket and to said water distributing means for delivering water to be heated thereto.

9. In a swimming pool heater, the combination of:

(a) a horizontally oriented rectangular housing having inlet and outlet ends and provided at its inlet end with a horizontally facing air inlet and at its outlet end with a horizontally facing outlet for products of combustion;

(b) forced draft means in said housing for flowing air and products of combustion through said housing from its inlet to its outlet;

(c) a combustion chamber in said housing adjacent its inlet end;

(d) burner means in said combustion chamber adjacent the inlet end of said housing and facing the outlet end thereof;

(e) a water jacket enclosing the sides and top of said combustion chamber;

(f) a water chamber in said housing adjacent its outlet end;

(g) means in said housing for distributing water throughout said water chamber into direct and intimate contact with the products of combustion emanating from said combustion chamber and passing through said water chamber;

(h) a sump in said housing below said combustion and water chambers for collecting water from said water jacket and the water distributed throughout said water chamber by said distributing means;
(i) said water jacket having discharge means communicating with said sump;
(j) said sump having water outlet means; and
(k) water supply means connected to said water jacket and to said water distributing means for delivering water to be heated thereto.

10. In a swimming pool heater, the combination of:
(a) a horizontally oriented rectangular housing having inlet and outlet ends and provided at its inlet end with a horizontally facing air inlet and at its outlet end with a horizontally facing outlet for products of combustion;
(b) forced draft means in said housing for flowing air and products of combustion through said housing from its inlet to its outlet;
(c) a combustion chamber in said housing adjacent its inlet end;
(d) burner means in said combustion chamber adjacent the inlet end of said housing and facing the outlet end thereof;
(e) a water jacket enclosing the sides and top of said combustion chamber;
(f) a water chamber in said housing adjacent its outlet end;
(g) means in said housing for distributing water throughout said water chamber into direct and intimate contact with the products of combustion emanating from said combustion chamber and passing through said water chamber;
(h) a sump in said housing below said combustion and water chambers for collecting water from said water jacket and the water distributed throughout said water chamber by said distributing means;
(i) said water jacket having discharge means located adjacent the top thereof, and located adjacent the end thereof which is closest to the inlet end of said housing, and communicating with said sump;
(j) said sump having water outlet means; and
(k) water supply means connected to said water jacket, adjacent the end thereof which is closest to the outlet end of said housing, and connected to said water distributing means, for delivering water to be heated to said water jacket and said water distributing means.

11. In a swimming pool heater, the combination of:
(a) a horizontally oriented housing having inlet and outlet ends and provided at its inlet end with a horizontally facing air inlet and at its outlet end with a horizontally facing outlet for products of combustion;
(b) forced draft means in said housing for flowing air and products of combustion through said housing from its inlet to its outlet;
(c) a combustion chamber in said housing adjacent its inlet end;
(d) burner means in said combustion chamber adjacent the inlet end of said housing and facing the outlet end thereof;
(e) a water jacket at least partially enclosing said combustion chamber;
(f) a water chamber in said housing adjacent its outlet end;
(g) means in said housing for distributing water throughout said water chamber into direct and intimate contact with the products of combustion emanating from said combustion chamber and passing through said water chamber;
(h) a sump in said housing at the bottom of said water chamber for collecting the water distributed throughout said water chamber by said distributing means;
(i) said water jacket having discharge means communicating with said sump;
(j) said sump having water outlet means;
(k) water supply means connected to said water jacket and to said water distributing means for delivering water to be heated thereto; and
(l) means for maintaining said water jacket under superatmospheric pressure.

12. In a swimming pool water heat exchanger, the combination of:
(a) a horizontally oriented housing having inlet and outlet ends and provided at its inlet end with a horizontally facing air inlet and at its outlet end with a horizontally facing outlet;
(b) forced draft means in said housing for flowing air through said housing from its inlet to its outlet;
(c) a water chamber in said housing;
(d) vertical baffles in said water chamber alternate ones of which extend downwardly from the top of said water chamber toward the bottom thereof, and the rest of which extend upwardly from the bottom of said water chamber toward the top thereof;
(e) means in said housing for distributing water vertically throughout said water chamber and between said baffles into direct and intimate contact with air passing through said water chamber;
(f) a sump in said housing at the bottom of said water chamber for collecting the water distributed throughout said water chamber by said distributing means;
(g) said sump having water outlet means; and
(h) water supply means connected to said water distributing means for delivering water thereto.

13. In a swimming pool water heat exchanger, the combination of:
(a) a horizontally oriented housing having inlet and outlet ends and provided at its inlet end with a horizontally facing air inlet and at its outlet end with a horizontally facing outlet;
(b) forced draft means in said housing for flowing air through said housing from its inlet to its outlet;
(c) a water chamber in said housing;
(d) vertical baffles in said water chamber alternate ones of which extend downwardly from the top of said water chamber toward the bottom thereof, and the rest of which extend upwardly from the bottom of said water chamber toward the top thereof;
(e) the area of the passages between adjacent baffles, the area of the passages below said downwardly extending baffles, and the area of the passages above said upwardly extending baffles, all being substantially equal;
(f) means in said housing for distributing water vertically throughout said water chamber and between said baffles into direct and intimate contact with air passing through said water chamber;
(g) a sump in said housing at the bottom of said water chamber for collecting the water distributed throughout said water chamber by said distributing means;
(h) said sump having water outlet means; and
(i) water supply means connected to said water distributing means for delivering water thereto.

14. In a swimming pool water heat exchanger, the combination of:
(a) a horizontally oriented housing having inlet and outlet ends and provided at its inlet end with a horizontally facing air inlet and at its outlet end with a horizontally facing outlet;
(b) forced draft means in said housing for flowing air through said housing from its inlet to its outlet;
(c) a water chamber in said housing;
(d) vertical baffles in said water chamber alternate ones of which extend downwardly from the top of said water chamber toward the bottom thereof, and the rest of which extends upwardly from the bottom of said water chamber toward the top thereof;
(e) the area of the passages between adjacent baffles, the area of the passages below said downwardly extending baffles, and the area of the passages above said upwardly extending baffles all being substantially equal, and being less than the area of said air inlet;
(f) means in said housing for distributing water vertically throughout said water chamber and between said baffles into direct and intimate contact with air passing through said water chamber;
(g) a sump in said housing at the bottom of said water chamber for collecting the water distributed throughout said water chamber by said distributing means;
(h) said sump having water outlet means; and
(i) water supply means connected to said water distributing means for delivering water thereto.

15. In a water heater, the combination of:
(a) a horizontally oriented elongated housing having at its respective ends an inlet for air and an outlet for air and products of combustion;
(b) forced draft means in said housing for flowing air and products of combustion longitudinally through said housing to said outlet;
(c) a combustion chamber in said housing adjacent and communicating with said inlet;
(b) burner means in said combustion chamber;
(e) a water jacket at least partially enclosing said combustion chamber;
(f) a water chamber in said housing between and communicating with said combustion chamber and said outlets;
(g) means in said housing for dispersing water throughout said water chamber into direct and intimate contact with the products of combustion emanating from said combustion chamber and passing through said water chamber;
(h) water outlet means communicating with said water jacket and said water chamber;
(i) means for supplying water to said water jacket and said water dispersing means; and
(j) said water supplying means including means for delivering a major portion of the water to said water dispersing means.

16. In a water heater, the combination of:
(a) a horizontally oriented housing having inlet and outlet ends and provided at its inlet end with a horizontally facing air inlet and at its outlet end with a horizontally facing outlet for products of combustion;
(b) forced draft means in said housing for flowing air and products of combustion through said housing from its inlet to its outlet;
(c) a combustion chamber in said housing adjacent its inlet end;
(d) burner means in said combustion chamber adjacent the inlet end of said housing;
(e) a water jacket at least partially enclosing said combustion chamber;
(f) a water chamber in said housing adjacent its outlet end;
(g) means in said housing for distributing water throughout said water chamber into direct and intimate contact with the products of combustion emanating from said combustion chamber and passing through said water chamber;
(h) a sump in said housing at the bottom of said water chamber for collecting the water distributed throughout said water chamber by said distributing means;
(i) water outlet means for receiving water from said water jacket and said sump; and
(i) means for supplying water to said water jacket and said water distributing means.

References Cited in the file of this patent
UNITED STATES PATENTS

| | | |
|---|---|---|
| 613,999 | Hurlbut | Nov. 8, 1898 |
| 382,632 | Waldbaur | Feb. 14, 1905 |
| 1,527,740 | Lipshitz | Feb. 24, 1925 |
| 2,327,039 | Heath | Aug. 17, 1943 |
| 2,767,784 | Dean | Oct. 23, 1956 |

FOREIGN PATENTS

| | | |
|---|---|---|
| 15,875 | Great Britain | of 1904 |

UNITED STATES PATENT OFFICE
CERTIFICATE OF CORRECTION

Patent No. 3,165,103 January 12, 1965

Harry L. Warner

It is hereby certified that error appears in the above numbered patent requiring correction and that the said Letters Patent should read as corrected below.

Column 1, line 26, and column 2, line 40, for "divided", eac occurrence, read -- divide --; column 5, line 57, for "superatmosphere" read -- superatmospheric --; column 7, line 19, for "dimension" read -- dimensioned --; column 9, line 13, for "driect" read -- direct --; line 33, for "throught" read -- through --; line 39, for "thereoff" read -- thereof --; same column 9, line 40, for "packet" read -- jacket --; column 10, lines 17 and 18, for "delivery" read -- delivering --; column 14, lines 14 and 15, strike out "horizontally facing air inlet and at its outlet end with a"; column 16, line 30, for "(i)" read -- (j) --.

Signed and sealed this 29th day of June 1965.

(SEAL)
Attest:

ERNEST W. SWIDER
Attesting Officer

EDWARD J. BRENNER
Commissioner of Patents